Dec. 1, 1942.  S. GOLDBERG  2,303,352
METHOD OF APPLYING CONE WRAPPERS
Filed Oct. 1, 1938

INVENTOR.
SIDNEY GOLDBERG.
BY Harry C. Leverts
ATTORNEY.

Patented Dec. 1, 1942

2,303,352

UNITED STATES PATENT OFFICE 2,303,352

METHOD OF APPLYING CONE WRAPPERS

Sidney Goldberg, Chicago, Ill., assignor, by mesne assignments, to Universal Paper Products Company Application October 1, 1938, Serial No. 232,721

2 Claims. (Cl. 93—2)

This invention relates to cone wrappers and more particularly to their method of application and removal, although certain features thereof may be employed with equal advantage for other purposes.

It contemplates more especially the novel association of a wrapper with an edible ice cream cone so as to serve as a sanitary handling medium therefor and also afford the convenient removal therefrom so that the cone can be entirely consumed without entailing any appreciable inconvenience.

The provision of wrappers in association with edible ice cream cones is not entirely new, but their application by adhesion to preclude accidental separation therebetween and still afford the convenient and speedy removal thereof, is highly desirable and renders the use thereof practical. The handling of ice cream cones is ordinarily considered unsanitary in that the bakers, vendors, and purchasing public contribute to the contamination thereof to some degree so that their consumption is not entirely consistent with health and sanitation.

Then, too, cone wrappers ordinarily preclude the consumption of the entire cone and their convenient and effective removal is a desirable expedient to overcome this normal disadvantage when using a wrapper that is desirable from a sanitary and advertising standpoint. Cone wrappers afford an ideal opportunity for advertising and trademark identification besides purchasing public appeal due to improved sanitation accompanying the handling thereof and dispensing of ice cream therewith.

One object of the present invention is to provide an improved cone wrapper that affords convenient application and removal to afford complete sanitation in the handling thereof and complete consumption of the edible cone.

Another object is to provide a cone wrapper that is adhesively associated with an edible cone base for effective connection thereto without precluding the ready removal thereof.

Still another object is to provide a non-edible wrapper that is adhesively associated with an edible cone base for effective connection thereto in the form of a convolute without precluding the ready removal thereof.

A further object is to provide a conical cone wrapper for spotted adhesive joinder with an edible cone base so as to preclude the accidental separation therefrom and still afford convenient removal.

A still further object is to provide a convolutely formed cone wrapper that is rendered self-sustaining and form-retaining by an adhesive provided between convolutes thereof and an edible cone base to preclude accidental separation and yet afford ready removal.

Still a further object is to provide a convolutely formed non-edible wrapper with an edible adhesive supported between convolutes thereof and joined therewith to an edible cone base for effective connection and convenient removal to afford complete consumption of the edible cone.

Other objects and advantages will appear from the following description of an illustrative embodiment of the present invention.

Figure 1:
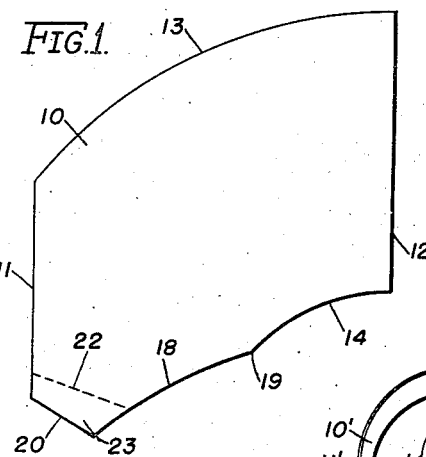
Figure 1 is a development of a non-edible cone wrapper blank embodying features of the present invention.

The structure selected for illustration comprises a non-edible paper blank 10 which is initially cut, stamped or otherwise shaped from suitable paper sheet material that is of such thinness as to normally render such incapable of self-support in its extended or flat form. The sheet material is preferably stamped, cut or otherwise shaped to form blanks 10 having parallel disposed side edges 11 and 12 with a curved or arcuate edge 13 interposed therebetween to constitute the top peripheral edge of a wrapper convolutely formed as will appear more fully hereinafter.

The blank 10 has an edge portion 14 contiguous with the side edge 12 and curved to be substantially concentric with the arcuate edge 13 so as to constitute the lower circumferential line of a convolutely formed wrapper disposed parallel to the upper circumferential edge 13 when applied to an edible ice cream cone 15 that is usually pre-baked from dough products to constitute a conical base 16 having an enlarged ice cream sustaining cup 17 formed integral therewith. Another edge portion 18 extends from the curved portion 14 to define a joinder 19 therewith, the edge 18 and the adjacent vertical side edges 11 being connected by an inclined edge 20 that assumes a vertical position when the blank 10 is convolutely wound and adhesively joined between overlapping convolutes to define a conical or frusto-conical cone wrapper 21 (Figure 4).

Figure 4:
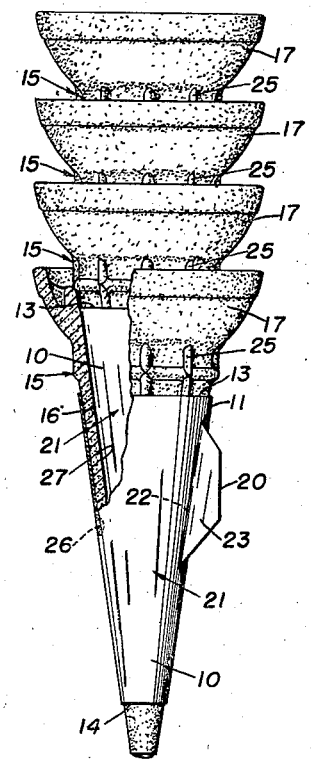
Figure 4 is a front view in elevation of an edible ice cream cone with a wrapper associated therewith in adhesively spotted cooperation therewith in a manner embodying the structure and teachings of the present invention.
Figure 5:
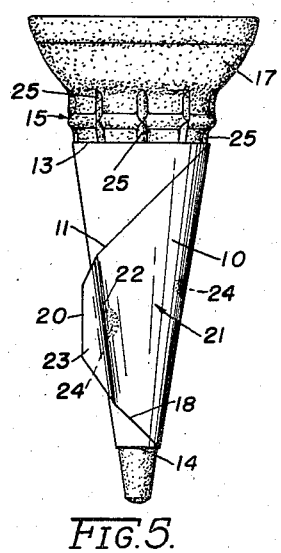
Figure 5 is a front view in elevation of a cone wrapper shown in association with a prebaked edible ice cream cone.
Figure 6:
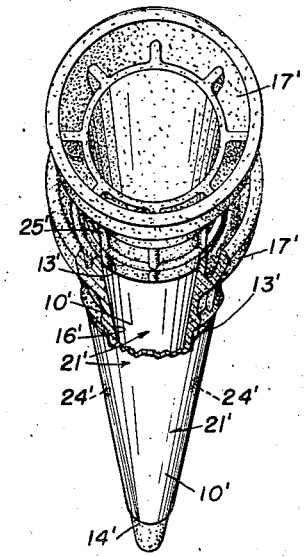
Figure 6 is a perspective view of a plurality of nested ice cream cones showing the manner of disposing wrappers therebetween for adhesive joinder with the upper cone, parts thereof being shown in section and broken away to clarify the showing.

In the embodiment shown in Figures 4 and 5, the blank 10 is externally convoluted and a crease line 22 is provided therein in divergent inclined relation with the edge 20 to define a flap 23 which always is accessible for finger grasp in effecting the speedy removal of the wrapper 21 from the edible cone 16. The convolutes of the blank 10 that is externally joined to form a wrapper 21 is rendered self-sustaining and form-retaining by spots of adhesive 24 composed from an edible crystalline matter such as tapioca paste to join overlapping portions thereof in defining a frusto-conical wrapper with an open circular top edge 13 and a comparatively smaller open circular bottom 14. The crease or fold line 22 may be dispensed with and the end tab 20 disposed flat against the body of the wrapper 21 depending upon the dictates of commercial practice.

It will be observed that the edible cone 15 is usually provided with intersecting ribs 25 that serve to reinforce the prebaked dough product and also afford the more convenient and effective grasp thereof. To preclude the accidental separation of the non-edible wrapper 21 from the prebaked edible base 16 of the cone 15, a crystalline edible adhesive is provided in the form of spots 26 extending for an area that is somewhat greater than the ribs 25 so that slight variations in the associated relationship therebetween will still provide for joinder by crystalline adhesive spots 26 which will touch one or more of the ribs 25 on the exterior of the cone 15. The crystalline character of the edible adhesive 26 serves to provide for the normal joinder between the wrapper 21 and the conical base 16 of the ice cream cone 15, and still permits the tearing separation of the wrapper 21 therefrom without requiring any appreciable effort.

It is preferred that the wrappers 21 be preformed so that they will be available in nested stacks so that they can be manually or machine displaced into the correspondingly shaped and sized interior 27 of the prebaked cone 15 with the flap 23 extended to assume a position adjacent the body of the wrapper 21. After the wrapper 21 is disposed in the interior 27 of the ice cream cone 15, a plurality of concentrically spaced spots of adhesive 26 is deposited thereon in any suitable manner as a preliminary step to disposing another cone 15 in nested relation with the previously positioned lower cone 15 so as to effect attachment of the interposed wrapper 21 with the upper and adjacently nested cone 15. Thus the inter-positioning of the conical wrappers 21 relatively to alternately nested cones 15 and the placement of adhesive spots 26 in the wrapper interiors will effect attachment thereof to the ribs 25 of the next adjacent upper cones 15 so as to effect their application and attachment in a series of predetermined steps so that the attachment between the non-edible wrappers 21 and the cones 15 is speedily and accurately effected with uniformity during the stacking thereof in the usual shipping cartons or containers.

It will be observed, therefore, that a simple, novel, and inexpensive wrapper 21 is convolutely and exteriorly attached to the conical base 16 of ice cream cones 15 in a continuity of operations that will not materially interfere with the normal stacking or nesting thereof in shipping cartons. After that part of the ice cream sustained by the cone cup 17 is consumed therewith, the wrapper 21 is easily and readily removed by exerting a pull on the flap 23 to rupture the crystalline adhesive spots 24 which join the overlapping wrapper convolutes to render the wrapper 21 normally self-sustaining and form-retaining. The continued pull exerted on the flap 23 will also rupture the adhesive spots 26 that join the wrapper 21 to the exterior ribs of the edible cones 15 so that the consumer can have full access for progressive consumption of the entire cone 15.

Figure 2:
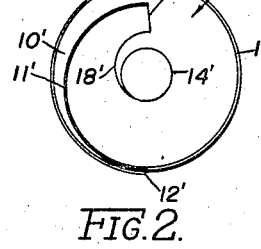
Figure 2 is a top plan view of a convolute cone wrapper.
Figure 3:
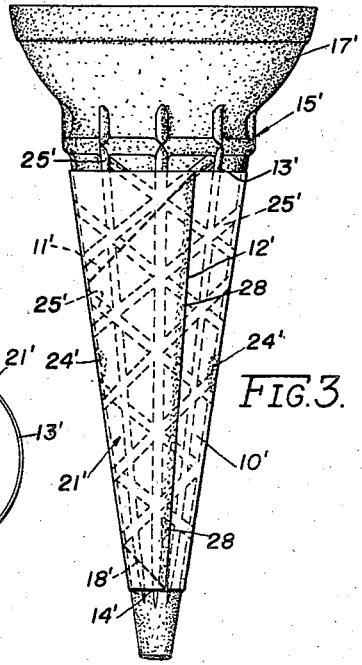
Figure 3 is a front view in elevation of a plurality of nested cones having convoluted cone wrappers interposed therebetween of the type shown in Figure 1, part of the lower cone being broken away and shown in section to clarify the structure.

In the embodiment shown in Figures 2 and 3, the wrapper 21' is internally rather than externally convoluted without any formation of an extending tab 23 in that the outer edge 20' thereof is disposed internally and adjacent the overlapping convolute so that the wrapper 21' will terminate externally in a straight vertical edge 12' that in the preceding embodiment was internally disposed. The wrapper 21', therefore, consists of nested convoluting of the blank 10 and the adjacent surfaces are, in this instance, more permanently joined by films of adhesive 28.

The wrapper 21' is adhesively joined to the external ribs 25' of the cone 15' by edible crystalline adhesive spots 24' in much the same way as prescribed supra. To effect removal of the wrapper 21' from the cone 15', however, it is not unravelled as shown and described in connection with the wrapper 21 (Figures 4 and 5), but concentrically twisted relative to the cone 15' so as to rupture the crystalline adhesive spots 24' and permit the removal of the entire wrapper 21' in a self-sustaining and form-retaining condition.

It will be observed, therefore, that a very simple, inexpensive, and effective method of forming, applying and removing cone wrappers has been provided, and these may be applied to cones 15 and 15' while being stacked in nested relation in shipping containers for storage and handling purposes during the marketing thereof. Advertising matter including trademarks as well as merchandising premium plans may be very readily placed on the wrappers 21—21' in accordance with the features of the present invention.

Then, too, a cone expands owing to the absorption of atmospheric moisture upon removal from the baking oven. This absorption endures over a period of days depending upon atmospheric conditions. Heating the paper wrappers 21 in a moisture laden or saturated chamber will sufficiently increase the diameter and size of the wrappers 21 so that the association of preformed heated wrappers 21 or 21' with freshly baked cones at the time of their removal from the baking oven, will permit their free unity or attachment without resort to adhesives. When so stacked in shipping containers and with the passing days between their boxing and trade usage, the prebaked dough cones 15 or 15' will expand and the wrapper 21 or 21' will contract to establish a tight frictional union therebetween to preclude the accidental separation thereof and permit manual removal by the consumer for eating access to the edible base 16 or 16'. The removal of the wrapper 21 can be easily effected by the unravelling pull exerted on its tab 23, while the wrapper 21' can be removed by relative concentric twisting displacement therebetween. For that matter the wrapper 21 can also be removed in the manner prescribed for the wrapper 21'.

Various changes may be made in the embodiment of the invention herein specifically described without departing therefrom or sacrificing any of the advantages or features thereof, and nothing herein shall be construed as limitations upon the invention, its concept or structural embodiment as to the whole or any part thereof except as defined in the appended claims.

I claim:

1. A method of applying a wrapper to an edible ice cream cone which consists in positioning a self-sustaining and form-maintaining non-edible conical wrapper in the interior of a fresh pastry cone that is still warm and possessed of expansive tendencies, and then nesting another warm and fresh pastry cone therein for displacement into said wrapper to effect frictional association therewith, and then permitting the nested cones with their wrappers to cool sufficiently to permit normal cone expansion for effectively holding the wrapper thereon.

2. A method of applying a wrapper to an edible ice cream cone which consists in positioning a self-sustaining and form-maintaining non-edible conical wrapper in the interior of a fresh pastry cone that is still warm and possessed of expansive tendencies, and then nesting another similarly warm and fresh pastry cone therein for displacement into said wrapper containing an edible adhesive on its inner surface to effect frictional and adhesive association therewith, and then permitting the nested cones with their wrappers to cool sufficiently to permit normal cone expansion for effectively holding the wrapper thereon.

SIDNEY GOLDBERG.